Oct. 16, 1928.
F. OUGHTON
1,687,783
STEERING WHEEL FOR AUTOMOBILES
Filed Jan. 4, 1928
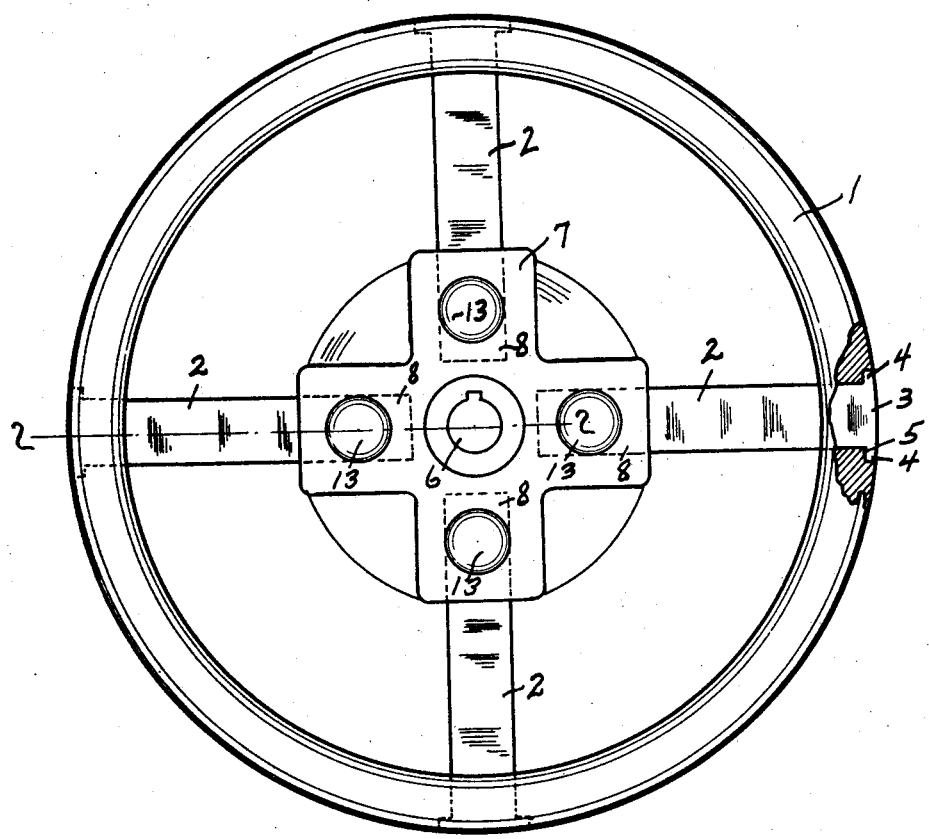
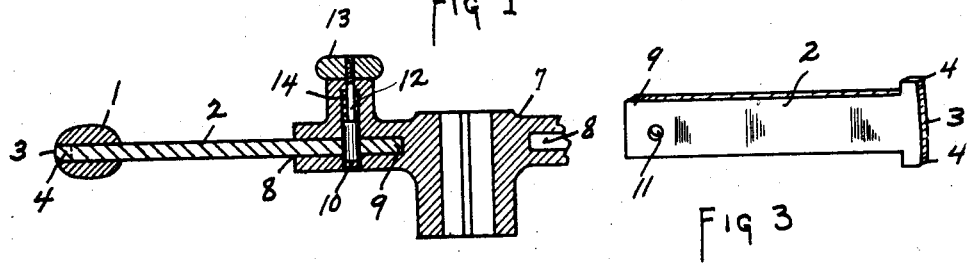
Fig 1
Fig 2
Fig 3
Frank Oughton
INVENTOR.
BY
ATTORNEY.

Patented Oct. 16, 1928.

1,687,783

UNITED STATES PATENT OFFICE.

FRANK OUGHTON, OF YOUNGSTOWN, OHIO.

STEERING WHEEL FOR AUTOMOBILES.

Application filed January 4, 1928. Serial No. 244,529.

This invention relates to steering wheel for automobiles. The principal object of this invention is to provide a steering wheel that may be easily disassembled and assembled. The object of disassembling is to prevent theft of the machine.

Another object of the invention is to provide removable spokes.

A still further object is to provide removable spokes functioning with an outer rim of a steering wheel and means for securing an inner end of said spokes.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a top plan view of the device with part broken away.

Figure 2 is a cross section taken on line 2—2 of Figure 1.

Figure 3 is a detailed view showing one of the spokes.

By referring to the drawing it will be seen that I have provided a rim 1. This rim 1 is ordinarily utilized for the purpose of gripping and steering an automobile. This rim 1 is supported by a plurality of spokes 2. Each of these spokes 2 is provided with an outer head 3 having head projections 4 which fit into a seat 5 formed in the rim 1. Securely attached to a steering post 6 I have provided a hub member 7. This hub member 7 is provided with slotted recesses 8 into which are inserted an inner end 9 of the spokes 2. When the spokes 2 are in correct position, they are held securely by means of a keeper lug 10 which functions in an opening 11 formed near the inner end 9 of the spokes 2. This keeper lug is manipulated by means of a stem 12 and a button 13. In order to hold the keeper lug in a securing position I have provided a coil spring 14 functioning by exerting a constant down pressure upon the same. It is obvious that if desired, the keeper lug 12 may be formed so as to be securely locked when the spokes 2 have been removed from the slotted recesses 8. This locking means may be done by any ordinary means known to the art in the construction of locks or in combination locks which might be manipulated by means of each of the buttons 13 or by utilizing the inner end 9 as a key which would automatically release the keeper lug 10 when inserted. The purpose of this locking means being to prevent any unauthorized attempt to assemble the wheel by a thief or unauthorized person by attempting to insert spokes not especially designed for that particular steering wheel.

What I claim is:—

1. In a device of the class described, a hub portion securely attached to a steering post of an automobile, a plurality of slotted recesses in said hub portion for the purpose of the insertion of spokes, a plurality of removable spokes functioning in said slotted recesses, a rim carried by said spokes, each spoke passing through said rim and securing said rim by means of an outer head, a plurality of keeper lugs for the purpose of securing inner ends of said spokes and means for manipulating the same positioned on the hub portion of said device, substantially as described for the purpose set forth.

2. In a device of the class described, a rim, a plurality of openings through said rim, a plurality of removable spokes functioning with said rim, a hub portion, a plurality of slotted openings in said hub portion for the reception of inner ends of said spokes, an opening in each inner end of said spokes, a keeper lug functioning with said opening, means for manipulating said keeper lug, substantially as described.

In testimony whereof I affix my signature.

FRANK OUGHTON.